J. E. Osborn.
Hat and Coat Rack.

Nº 91,559.  Patented Jun. 22, 1869.

Witnesses;
Peter L. S. Hawkinson
Abraham Franklin

Inventor,
Joseph E. Osborn

N. PETERS, PHOTO-LITHOGRAPHER, WASHINGTON, D.C.

JOSEPH E. OSBORN, OF CHICAGO, ILLINOIS.

Letters Patent No. 91,559, dated June 22, 1869.

IMPROVED HAT AND COAT-RACK.

The Schedule referred to in these Letters Patent and making part of the same.

*To all whom it may concern:*

Be it known that I, JOSEPH E. OSBORN, of Chicago, in the county of Cook, and State of Illinois, have invented new and useful Improvements upon Hat and Coat-Racks; and I do hereby declare that the following is a full and exact description thereof, reference being had to the accompanying drawings, and to the letters of reference marked thereon, making a part of this specification.

My invention consists in applying to hat and coat-racks the brace, four hooks for hats, four additional hooks for coats, and the adjustment of the hat-hooks, the coat-hooks, and a looking-glass, and their manner of operation.

To enable others skilled in the art to make and use my invention, I will proceed to describe its construction and operation.

Figure 1:
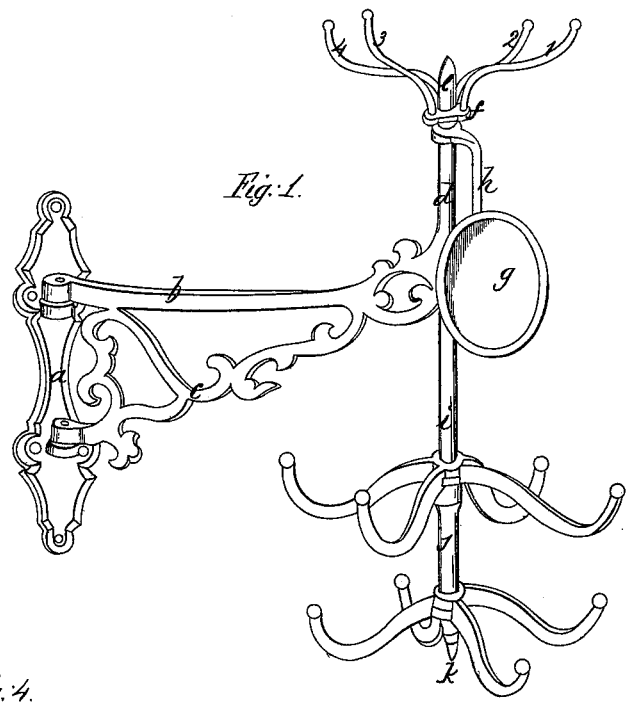

I construct my hat and coat-rack of brass, or any other material suitable for that purpose, consisting, in Figure 1, of a bed-piece, $a$, with six screw-holes and two pivot-hinges, from which projects an arm, $b$, to which is applied the brace $c$, from which arm there radiates upward a shaft, $d$, to the upper end of which are adjusted, by means of a screw, $e$, four revolving hooks for hats, 1, 2, 3, 4, screwed into a plate, $f$, which may or may not revolve upon the shaft $d$, and to which shaft $d$ is also adjusted, by means of the arm $h$, and to the arm $h$, a looking-glass, $g$, which swings upon the shaft $d$, and is adjusted to the lower end of the arm $h$, so as to swing upward and downward, and to revolve about half way either way, upon hinges for that purpose.

Figures 2, 3, 4:
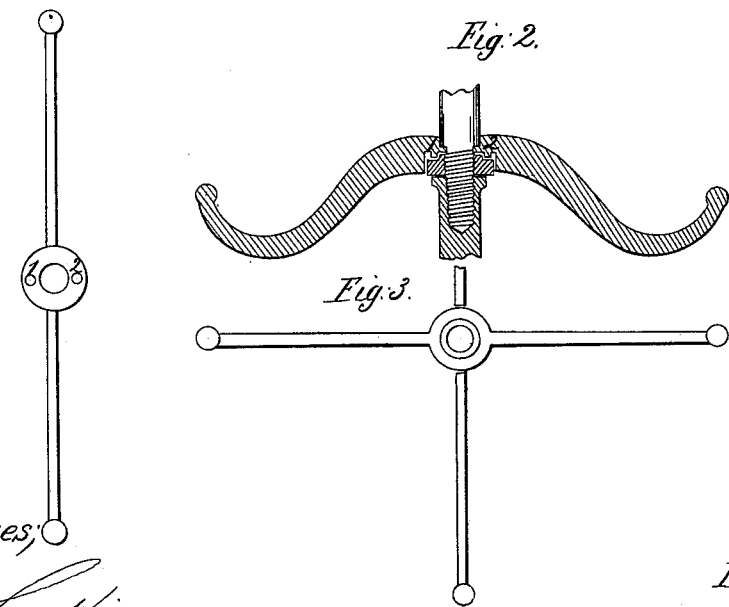

Also, from the arm $b$, radiates downward a shaft, or upright, $i$, constructed in two parts, $i$ and $j$, and united by means of a screw, as shown in Figure 2, to which shaft, or upright are adjusted eight hooks, for coats or other garments, as represented in fig. 1, to stand at right angles, and held in position by means of pivots and cavities for their insertion, as represented in Figure 4 by figures 1 and 2, and in fig. 2 by the same figures, and so adjusted as to revolve entirely, and so that the upper hooks of each brace of hooks may be raised sufficiently to permit each brace to clasp nearly together, and to stand at acute angles when out of use.

The lower hooks upon section $j$, fig. 1, of the shaft $i$, are sustained by a screw, $k$, screwed into section $j$.

Figure 3 represents a brace of the hooks upon the shaft $i$, detached therefrom.

What I claim as my invention, and desire to secure by Letters Patent, is—

The combination of the bed-piece $a$, the arm $b$, the brace $c$, the shafts $d\ i\ j$, the hat and coat-hooks described, and the looking-glass $g$, substantially as set forth.

JOSEPH E. OSBORN.

Witnesses:
PETER L. HAWKINSON,
ABRAHAM FRANKLIN.